3,580,948
1,1-DICHLORO-1-NITROETHANE DERIVATIVES
Leo R. Morris, Midland, Mich., assignor to The Dow Chemical Company, Midland, Mich.
No Drawing. Filed Aug. 1, 1968, Ser. No. 749,317
Int. Cl. C07c *69/22, 79/12*
U.S. Cl. 260—487     4 Claims

ABSTRACT OF THE DISCLOSURE

Disclosed are, as new compounds, α-(2,2-dichloro-2-nitroethyl)styrene, (1,3,3-trichloro-3-nitropropyl)benzene, and lower alkyl 2,4,4-trichloro-2-methyl-4-nitrobutyrates which are useful as pesticides.

---

The present invention relates to novel and useful derivatives of 1,1-dichloro-1-nitroethane and to methods for their production. More specifically, it is directed at α-(2,-dichloro-2-nitroethyl)styrene, (1,3,3 - trichloro-3-nitropropyl)benzene, and lower alkyl 2,4,4-trichloro-2-methyl-4-nitrobutyrates which are representable by the following formula.

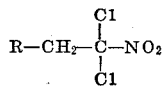

In this and succeeding formulas, R is selected from α-styryl, α-chlorobenzyl, and 1-carb(lower)alkoxy-1-chloroethyl.

In the present specification and claims, α-styryl defines the group

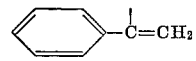

α-chlorobenzyl defines the group

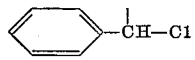

and 1-carb(lower)alkoxy-1-chloroethyl the group

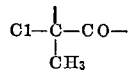

lower alkoxy. In the present specification and claims, the term "lower alkoxy" denotes the presence of an alkoxy group containing 1 to 2, to 3, to 4 and 1 and 2 and 3 and 4 carbon atoms, that is, methoxy, ethoxy, n-propoxy, isopropoxy, n-butoxy, sec-butoxy, isobutoxy, and t-butoxy.

The compounds of the present invention are crystalline solids or oily liquids at room temperature. They are only somewhat soluble in water but are soluble in many of the common organic solvents such as acetone and benzene. These compounds are useful as pesticides for the control of various household and agricultural pests including trash fish, fungal organisms, weeds, ascarids, worms, nematodes, flies, roaches, and so forth.

The defined compounds hereof are prepared by reacting together chloropicrin of the formula

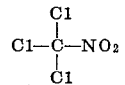

and an olefin which is selected from α-methylstyrene, styrene, and lower alkyl methacrylates. The reaction is initiated by employing an organic amine in combination with a copper containing material as a catalyst. The identity of the amine employed is not critical. Preferred amines are piperidine, diethylamine, diisopropylamine, 2,4-dimethylaniline, dibenzylamine, 3-picoline, butylamine, isobutylamine, dicyclohexylamine, hexylamine, and hexadecylamine. More preferred amines are those of the above which are secondary amines. The identity of the particular component which constitutes the source of the copper in the system is not critical. The copper, which is an essential part of the catalyst system, can be derived from any of a great many copper-containing substances; suitable copper materials include, for example, metallic copper, copper acetate, copper benzoate, cuprous bromide, cuprous carbonate, cupric carbonate, cupric chloride, cuprous chloride, cupric formate, cuprous iodide, cupric nitrate, cuprous oxide, cuprous sulfate, and cupric sulfate. The preferred copper material is anhydrous cuprous chloride.

The reaction is exothermic and takes place smoothly at temperatures over a wide range, as, for example, 0° to 200° C. Preferably, the reaction is conducted at temperatures of from about 80° to 150° C. The pressure under which the reaction is carried out is not critical; conveniently, atmospheric pressures are employed. The reaction can be carried out in the presence or absence of an inert liquid reaction medium. Suitable organic liquids which can be employed as inert liquid reaction medium include hydrocarbons such as pentane, benzene, and cyclohexane; and ethers, such as diethyl ether. It is preferred to avoid the use of a halogenated or olefinic organic compound as reaction medium, unless the same substance is to serve also as a reactant. Conveniently, excess chloropicrin or olefin reactant can be employed as reaction medium when operating at temperatures at which the compound is a liquid.

It is critical and essential that a catalytic amount of the amine-copper catalyst system be employed.

The system can be prepared in advance and then added to the reaction. Alternatively, the amine and copper can be added separately to the reaction mixture. The amount of each component of the catalyst system to be employed according to the present invention is critical only in that the components must be present in such amounts as in combination to exert a catalytic effect on the reaction. Minute traces, such as 0.0001 atomic equivalent copper, and 0.01 molecular equivalent amine per molecular equivalent of that reactant which is present in limiting quantity, give good results. Preferred operations employ about 0.005 atomic equivalents copper and 0.05 molecular equivalent amine per molecular equivalent of the limiting reactant.

The amounts of the reactants to be employed are not critical, some of the desired product being formed when employing any amounts. However, when it is desired to obtain higher yields within shorter reaction time and to employ the reactants in the amounts most efficient for complete conversion, it is preferred to employ one molecular proportion of the olefin reactant and from 1.0 to 4.0 molecular proportions of the chloropicrin. The reaction also proceeds when the olefin is present in excess, such as one molecular proportion of chloropicrin compound and from one to four molecular proportions of olefin compound.

In carrying out the reaction to prepare the products of the present invention, the chloropicrin and olefin are contacted together in any convenient order or fashion in the presence of a catalytic amount of the mixture of copper-containing material and the organic amine compound. Some of the desired product is prepared immediately upon the contacting together of the reactants and catalyst; however, higher yields result if the reaction mixture is given a longer reaction time. Also, yields of the desired product are increased if the reaction mixture is heated to the boiling point and under reflux for a period of time. Such product-containing reaction mixture can be employed as prepared for the useful purposes of the present invention. Alternatively, the product can be separated from the reaction mixture and from excess reactant or reactants by conventional procedures such as, for example, fractional distillation under subatmospheric pressure, filtration, and the like. Typically, the products are liquids and can be conveniently separated by distillation. Where it is desired, the separated product can be purified in known procedures such as fractional distillation under subatmospheric pressure or recrystallization.

The following examples illustrate the present invention but, as such, are not to be construed as limiting the same.

EXAMPLE 1

Styrene (20.8 grams; 0.200 mole) and chloropicrin (32.8 grams; 0.200 mole) and cuprous chloride (0.2 gram; 0.001 mole) are mixed together at room temperature with stirring. Dicyclohexylamine (1.5 milliliters; 0.0076 mole) is added to the resultant mixture while continuing the stirring. The reaction is thereafter allowed to proceed exothermically to a temperature of 130° C. and heating and stirring are then continued so as to maintain the temperature of the reaction mixture at from 100° to 130° C. for two hours. At the end of this time, the reaction mixture is cooled and diluted by the addition of water. The organic layer is separated by extraction with chloroform, washed several times with dilute hydrochloric acid and lastly with water. The washed organic layer chloroform extract is then separated and dried with sodium sulfate. The dried extracts are then concentrated in vacuo and distilled using a 30 inch Vigreux column to obtain a main cut boiling at 118° C. to 122° C. at 1.6 millimeters Hg pressure. This fraction is fractionally distilled under reduced pressure to obtain the desired (1,3,3-trichloro-3-nitropropyl)benzene product as a pale yellow oil boiling at 120° to 122° C. at 1.6 millimeters Hg pressure and having an index of refraction $n_D^{25}$ 1.5497.

Elemental analysis.—Calculated for $C_9H_8Cl_3NO_2$ (percent): Cl, 39.5. Found (percent): Cl, 39.8.

EXAMPLE 2

A mixture of 30 milliliters (0.23 mole) of α-methylstyrene, 32.8 grams (0.200 mole) of chloropicrin, and 0.2 gram (0.001 mole) of cuprous chloride is prepared by combining the three ingredients at room temperature with stirring. This mixture is heated to the boiling point and maintained under reflux while 0.5 milliliter (0.002 mole) of dicyclohexylamine is added. After ½ hour an additional 0.5 milliliter of the amine is added and the resultant mixture then heated with stirring at from 115° to 125° C. for two hours. The reaction mixture is then cooled and extracted with chloroform. The chloroform extracts are washed successively with dilute aqueous hydrogen chloride and with water, dried, concentrated in vacuo, and distilled under reduced pressure. A fraction boiling at 114°–115° C. at 3 millimeters Hg pressure is refractionated to obtain the desired α-(2,2-dichloro-2-nitroethyl)styrene product as a pale yellow liquid boiling at from 94° to 99° C. at 0.5 millimeter pressure and having a refractive index $n_D^{25}$ of 1.555.

Elemental analysis.—Calculated for $C_{10}H_9Cl_2NO_2$ (percent): Cl, 28.8. Found (percent): Cl, 28.2.

EXAMPLE 3

A mixture of 100 grams (1.00 mole) of methyl methacrylate, 125 grams (0.760 mole) of chloropicrin, 4.0 milliliters (0.024 mole) of dicyclohexylamine is prepared and heated at the boiling point and under reflux for 18 hours as described according to the procedures set forth in Examples 1 and 2. The reaction mixture is then processed as previously described to obtain a fraction boiling at from 58° to 92° C. at 2 to 0.9 millimeters pressure. This fraction is redistilled to give a cut boiling at from 57° to 59° C. at 2 millimeters Hg pressure. This fraction is cooled to a solid which is recrystallized twice from methanol to obtain the methyl 2,4,4-trichloro-2-methyl-4-nitrobutyrate product as a white crystalline solid melting at from 32.5° to 33.0° C.

Elemental analysis.—Calculated for $C_6H_8Cl_3NO_4$ (percent): C, 27.2; H, 3.0; Cl, 40.2. Found (percent): C, 28.0; H, 3.3; Cl, 40.0.

In accordance with the methods hereof, the following compounds are prepared.

Ethyl 2,4,4-trichloro-2-methyl-4-nitrobutyrate (molecular weight 278.5) by reacting together chloropicrin and ethyl methacrylate in the presence of piperidine and cupric chloride.

Isopropyl 2,4,4-trichloro-2-methyl-4-nitrobutyrate (molecular weight 292.6) by reacting together chloropicrin and isopropyl methacrylate in the presence of dibenzylamine and copper powder.

Sec-butyl 2,4,4-trichloro-2-methyl-4-nitrobutyrate (molecular weight 306.6) by reacting together chloropicrin and sec-butyl methacrylate in the presence of cuprous bromide and piperidine.

n-Butyl 2,4,4-trichloro-2-methyl-4-nitrobutyrate (molecular weight 306.6) by reacting together chloropicrin and n-butyl methacrylate in the presence of n-butylamine and cuprous carbonate.

The compounds of the present invention are useful as pesticides for the control of a wide variety of pest organisms such as Daphnia, goldfish, the causative agent of rice blast, pig ascarids, crabgrass, millet, rootknot nematode, cockroach, mites, and so forth.

In representative operations, each of α-(2,2-dichloro-2-nitroethyl)styrene, (1,3,3-trichloro-3-nitropropyl)benzene, and methyl 2,4,4-trichloro-2-methyl-4-nitrobutyrate give substantially complete controls and kills of Daphnia when separately dispersed in the water environment of such at a concentration of five parts per million by weight.

In additional operations, α-(2,2-dichloro-2-nitroethyl) styrene gives complete control and kill of rootknot nematode when it is applied at concentrations of 25 parts per million by weight to soil infested with such organisms.

In still further representative operations, (1,3,3-trichloro-3-nitropropyl)benzene gives 100 percent kills of each of the causative agents of rice blast, *Pseudomonas aeruginosa*, *Candida albicans*, and *Trichophyton mentagrophytes* when applied at concentrations of 500 parts per million by weight to environments supporting the growth of such organisms.

What is claimed is:

1. The compound corresponding to the formula

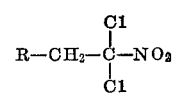

wherein R is α-styryl, α-chlorobenzyl, or 1-carb(lower)-alkoxy-1-chloroethyl.

2. The compound claimed in claim 1 which is α-(2,2-dichloro-2-nitroethyl)styrene.

3. The compound claimed in claim 1 which is (1,3,3-trichloro-3-nitropropyl)benzene.

4. The compound claimed in claim 1 which is methyl 2,4,4-trichloro-2-methyl-4-nitrobutyrate.

References Cited

UNITED STATES PATENTS

| | | | |
|---|---|---|---|
| 2,189,570 | 2/1940 | Schechter et al. | 260—646 |
| 2,335,384 | 11/1943 | Bousquet et al. | 260—646X |
| 3,513,243 | 5/1970 | Gold et al. | 424—311 |

LELAND A. SEBASTIAN, Primary Examiner

U.S. Cl. X.R.

260—646; 424—311, 349